(12) United States Patent
Tong et al.

(10) Patent No.: US 12,210,547 B2
(45) Date of Patent: *Jan. 28, 2025

(54) GENERATION AND ADAPTATION OF A VISUALIZATION FROM ONE OR MORE DATA SETS WITHOUT PRE-BUILDING AND STORING THE VISUALIZATION PRIOR TO RECEIVING A REQUEST FOR THE VISUALIZATION

(71) Applicant: Intuitive Data Analytics, LLC, Henderson, NV (US)

(72) Inventors: Wingloon L. Tong, Fullerton, CA (US); Ravi S. Samtani, Yorba Linda, CA (US)

(73) Assignee: Intuitive Data Analytics, LLC, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,843

(22) Filed: Jun. 12, 2023

(65) Prior Publication Data

US 2023/0325416 A1 Oct. 12, 2023

Related U.S. Application Data

(63) Continuation of application No. PCT/US2022/018225, filed on Feb. 28, 2022, which is a continuation-in-part of application No. 17/188,621, filed on Mar. 1, 2021, now Pat. No. 11,714,826.

(60) Provisional application No. 62/982,275, filed on Feb. 27, 2020.

(51) Int. Cl.
*G06F 16/28* (2019.01)
*G06F 16/22* (2019.01)
*G06T 11/20* (2006.01)

(52) U.S. Cl.
CPC ............ *G06F 16/287* (2019.01); *G06F 16/22* (2019.01); *G06T 11/206* (2013.01)

(58) Field of Classification Search
None
See application file for complete search history.

(56) References Cited

U.S. PATENT DOCUMENTS

| | | | |
|---|---|---|---|
| 6,642,946 B1 * | 11/2003 | Janes | G06Q 10/087 |
| | | | 715/962 |
| 2017/0132296 A1 * | 5/2017 | Ding | G06F 16/248 |
| 2018/0218050 A1 * | 8/2018 | Porath | G06F 16/248 |

* cited by examiner

*Primary Examiner* — Dawaune A Conyers
(74) *Attorney, Agent, or Firm* — Law Office of Raul D. Martinez, PC

(57) ABSTRACT

The systems and methods described herein analyze one or more selected data sources in their entirety and determine data relationships, using a single-branch approach. Indexes are created based on the determined data relationships, and data from the one or more data sets is imported into the indexes and stored in a back-end storage system. Once the data is analyzed and stored in the indexes, a user can submit a request for a data visualization. In response to the request, the system automatically generates (e.g., builds) and displays the requested data visualization to the user. In some examples, the user may request a modification of the data visualization such as changing the timeframe shown in the data visualization or adding/removing data associated with a particular parameter, and the system will automatically generate the modified data visualization for the user.

20 Claims, 9 Drawing Sheets

FIG. 6

GENERATION AND ADAPTATION OF A VISUALIZATION FROM ONE OR MORE DATA SETS WITHOUT PRE-BUILDING AND STORING THE VISUALIZATION PRIOR TO RECEIVING A REQUEST FOR THE VISUALIZATION

CLAIM OF PRIORITY

The present application claims priority to PCT International Application No. PCT/US22/18225, entitled "GENERATION AND ADAPTATION OF VISUALIZATIONS FROM ONE OR MORE DATA SETS USING A SINGLE-BRANCH APPROACH" and filed Feb. 28, 2022, which claims priority to U.S. patent application Ser. No. 17/188,621, entitled "GENERATION AND ADAPTATION OF VISUALIZATIONS FROM ONE OR MORE DATA SETS USING A SINGLE-BRANCH APPROACH" and filed Mar. 1, 2021, which claims priority to U.S. Patent Application No. 62/982,275, entitled "SYSTEMS AND METHODS FOR ADAPTIVE VISUALIZATION AND NAVIGATION OF MULTIPLE DISTINCT DATA SOURCES AND/OR DISPARATE DATA SETS" and filed Feb. 27, 2020, all of which are assigned to the assignee hereof and hereby expressly incorporated by reference in their entirety.

FIELD

The subject matter described herein relates to computer systems and more particularly to generating data visualizations on computer systems.

BACKGROUND

The amount of data generated, collected, and stored increases every year. Whether through the normal course of business or as a part of business transactions, an entity's data may be compiled and stored separately, without any thought or preparation in how one data source may be used in conjunction with another data source. Moreover, the entity may have multiple sources of disparate data sets where comparison, correlation, or extrapolation may provide unique, powerful, and valuable results.

SUMMARY

The systems and methods described herein analyze one or more selected data sources in their entirety and determine data relationships, using a single-branch approach. Indexes are created based on the determined data relationships, and data from the one or more data sets is imported into the indexes and stored in a back-end storage system. Once the data is analyzed and stored in the indexes, a user can submit a request for a data visualization. In response to the request, the system automatically generates (e.g., builds) and displays the requested data visualization to the user. In some examples, the user may request a modification of the data visualization such as changing the timeframe shown in the data visualization or adding/removing data associated with a particular parameter, and the system will automatically generate the modified data visualization for the user.

Figure 4:
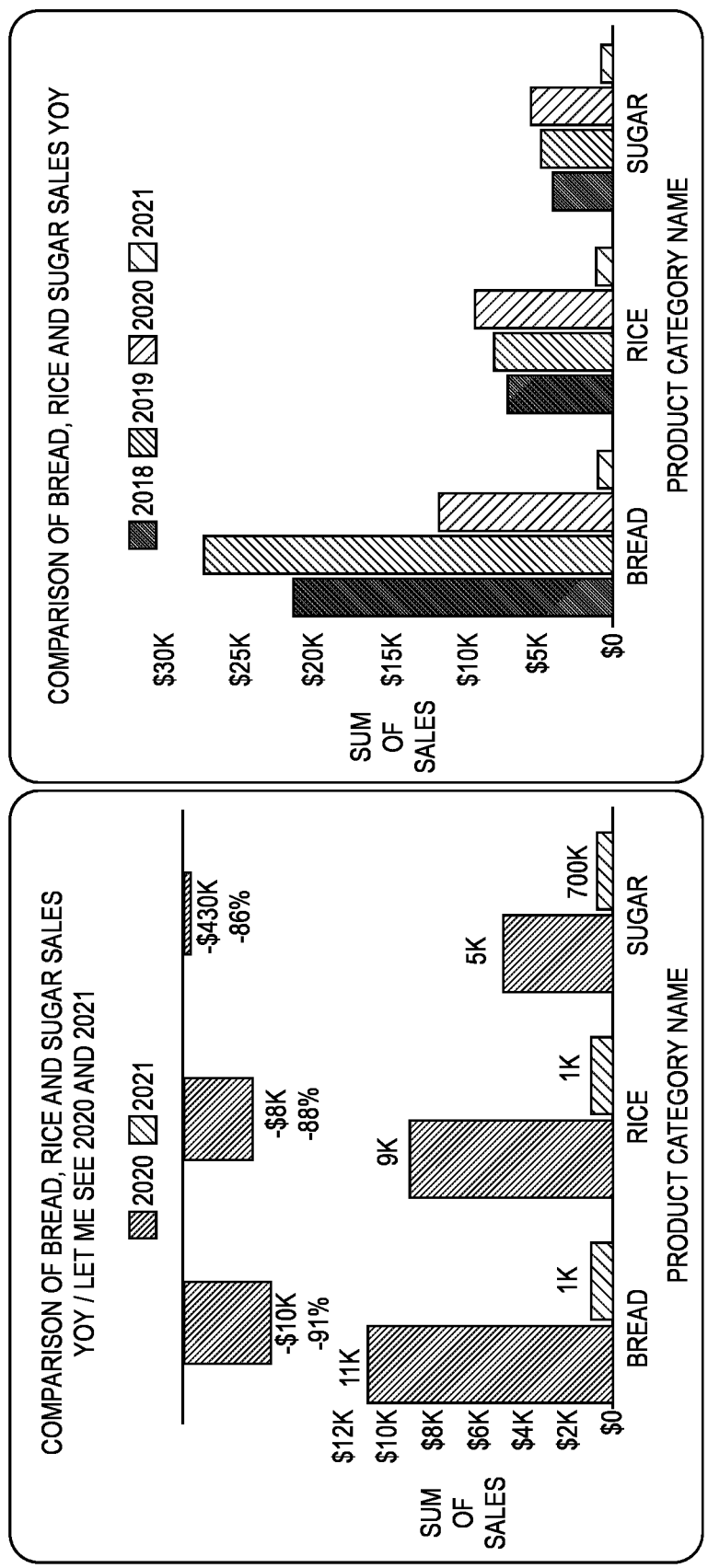

The right side of FIG. 4 shows an example of a data visualization generated in response to an initial user request. The left side of FIG. 4 shows an example of a data visualization generated in response to a drill down user request.

Figure 5:
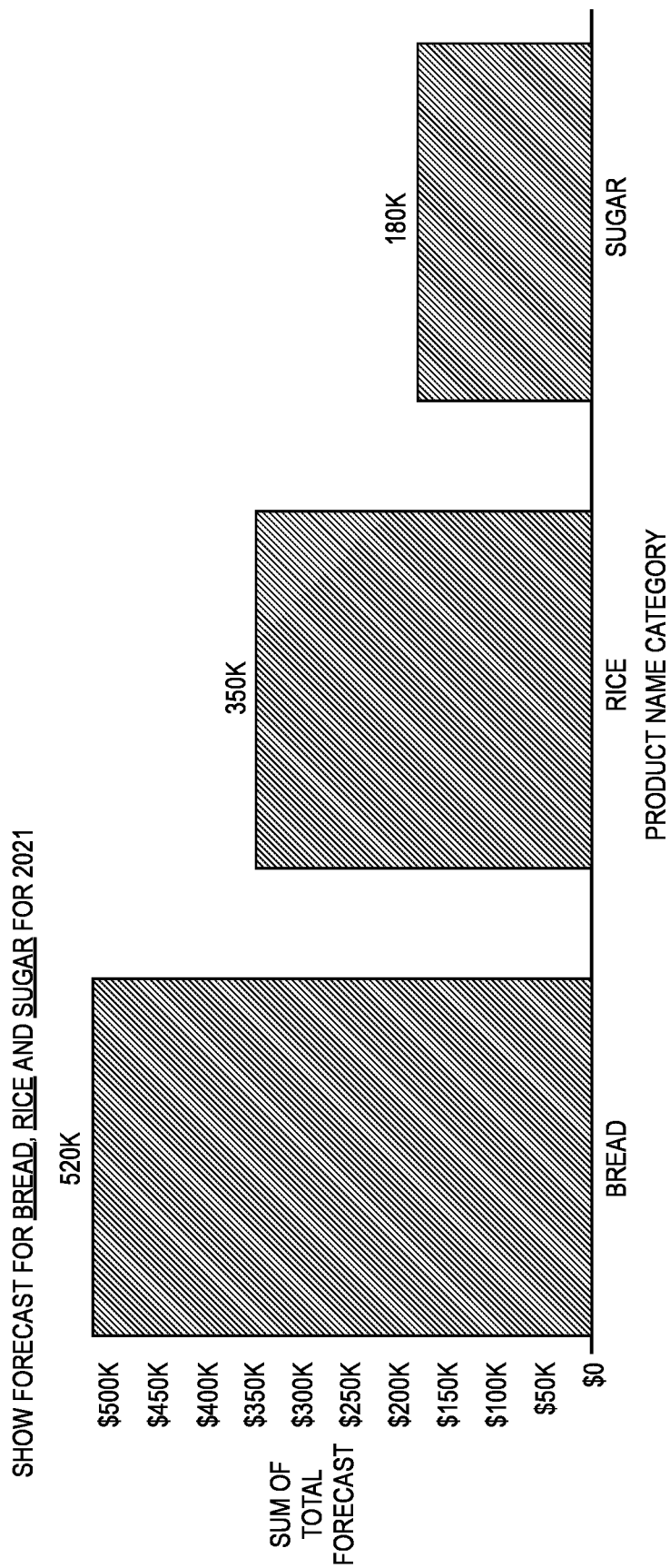

FIG. 5 shows an example of a data visualization generated using "Column Mapping" logic to forecast information provided quarterly.

Figure 6:
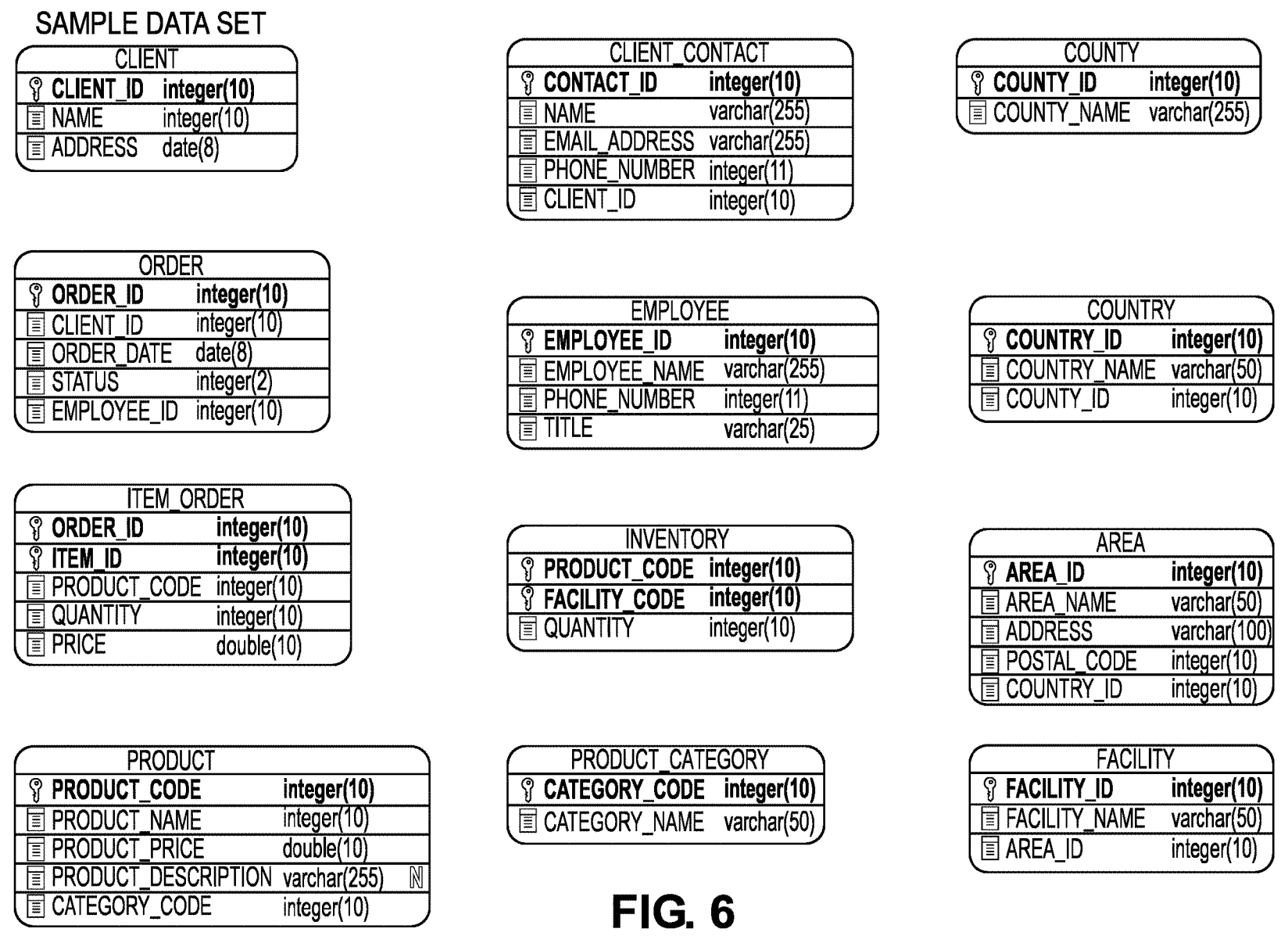

FIG. 6 shows an example of a sample data set for which data relationships will be determined using a single-branch approach.

Figure 7:
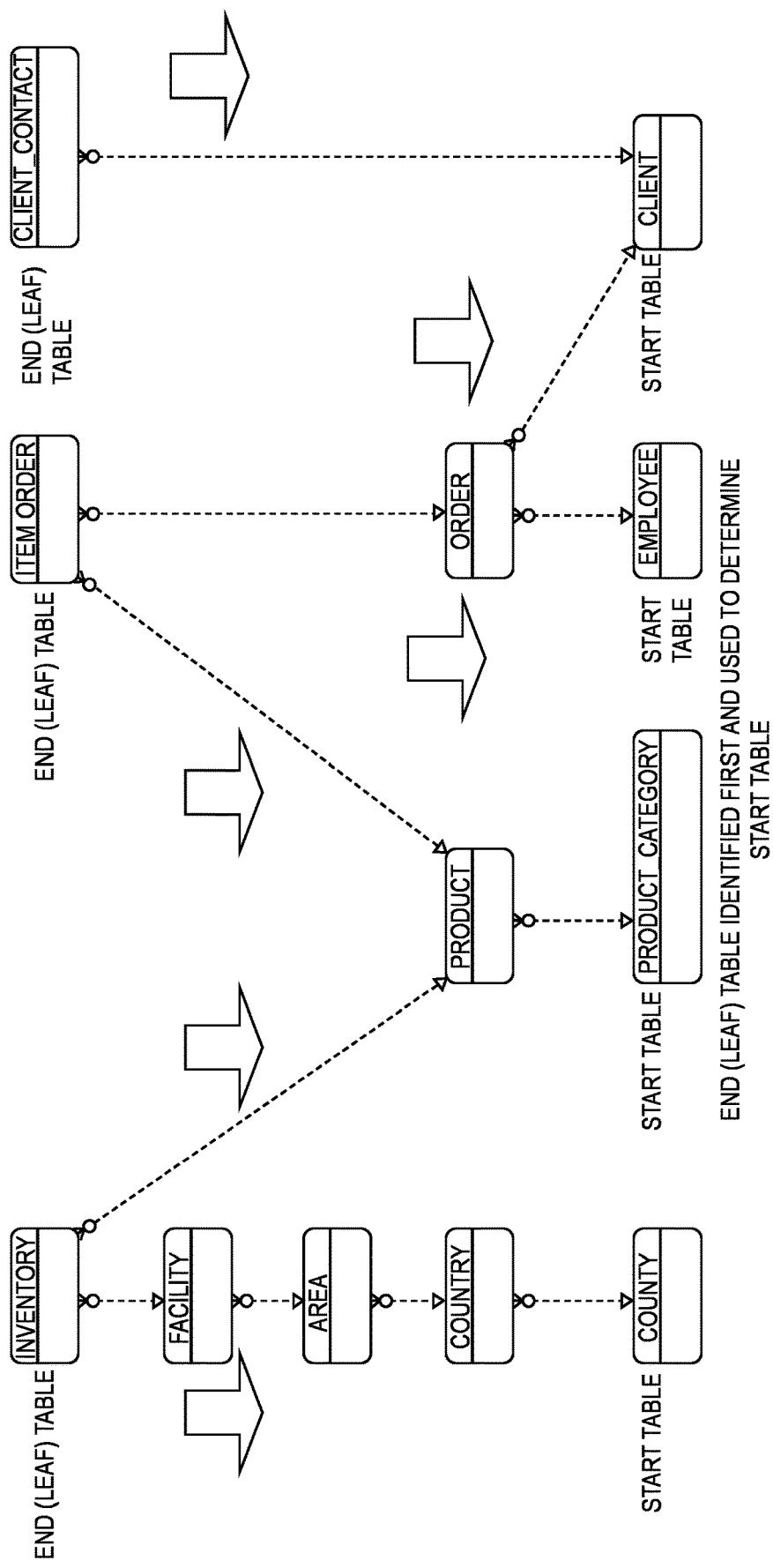

FIG. 7 shows a graphical representation of the data relationship connections for the sample data set from FIG. 6.

Figure 8A:
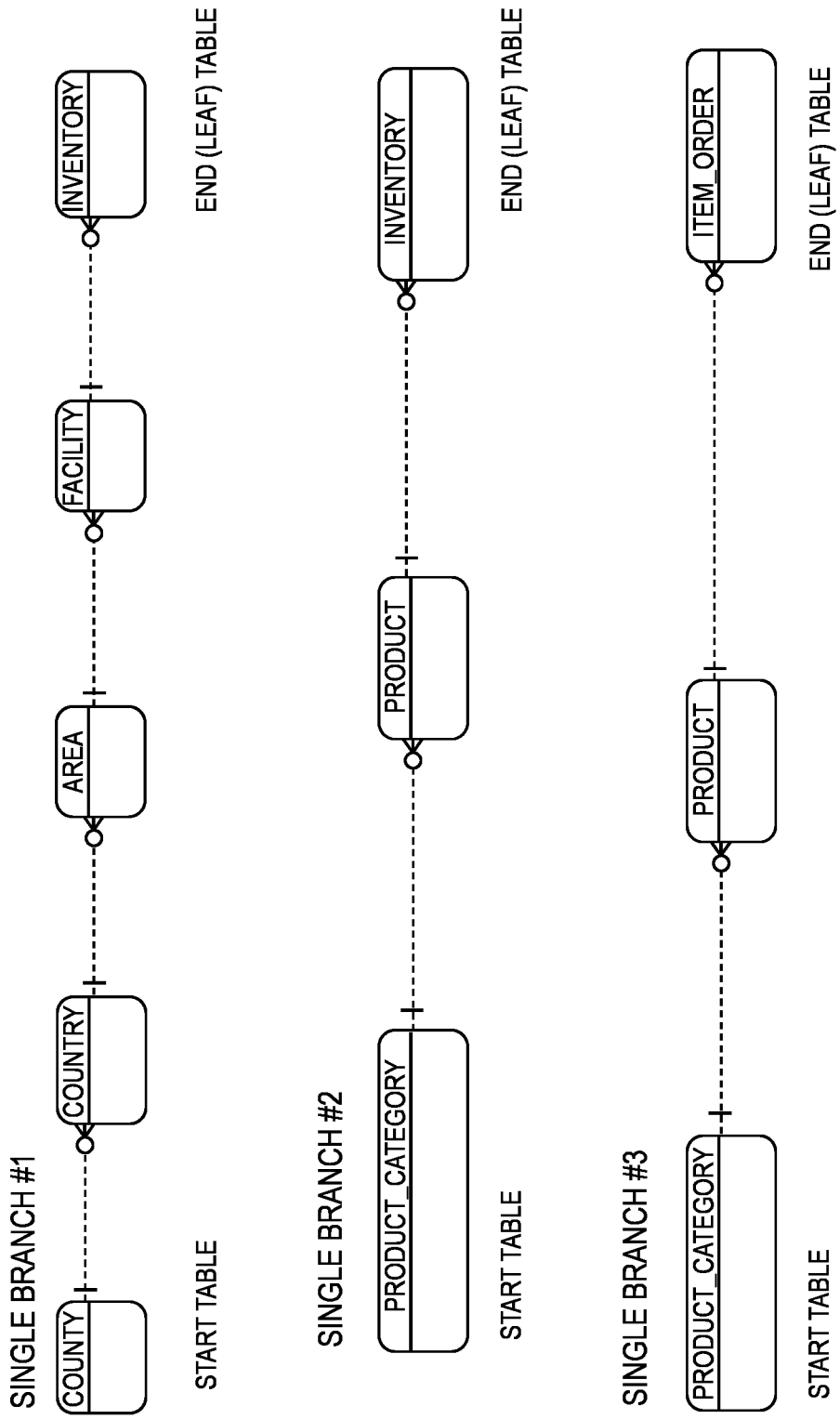

FIG. 8A shows a graphical representation of the determined data relationships for three single branches.

Figure 8B:
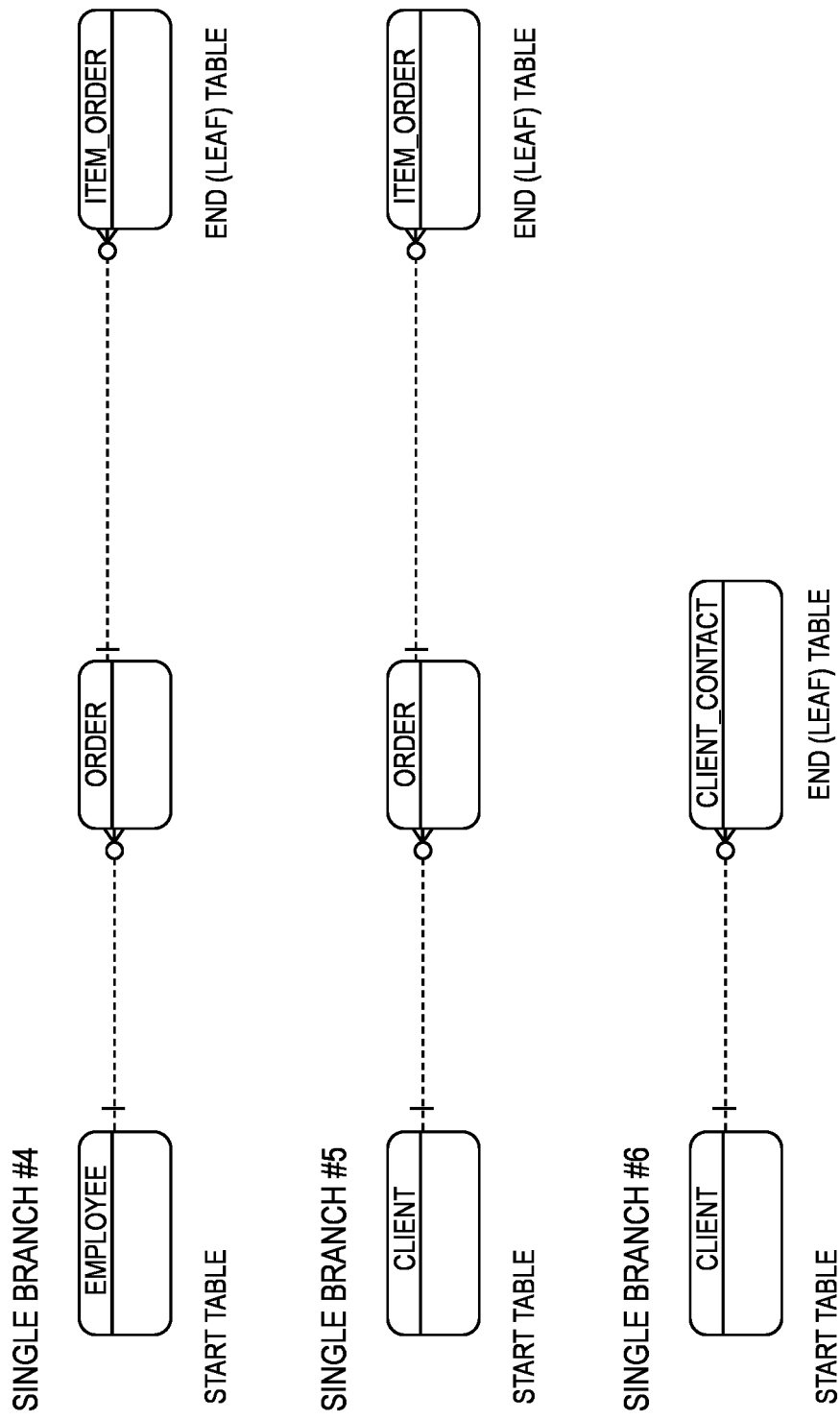

FIG. 8B shows a graphical representation of the determined data relationships for an additional three single branches.

DETAILED DESCRIPTION

Current data analytics platforms require a large amount of time and labor to setup and configure. For example, an individual with an Information Technology (IT) background or extensive database knowledge and experience is required to relate data from various sources and create indexes to enable users to request (e.g., query) the computer system for a data visualization that illustrates the requested information in a viewable format such as a graph or chart. Thus, current platforms require extensive and time-consuming pre-staging.

Moreover, in current systems, either the user or IT support needs to know before the system is launched which types of inquiries and information are relevant to a particular individual user, group of users, department, or business unit. Once that information is identified, the IT staff would need to have extensive knowledge of the database, fields, and source data and understand how they each "connect" to one another in order to provide useful results to the system users, based on the types of questions/information that is most likely to be required by the users. Prior attempts to utilize distinct data sources and disparate data sets require IT specialists to pre-build custom reports to the needs of management or departments that would often take weeks to create and consume large amounts technical resources to create and store. Thus, there has existed a long-felt need for systems and methods for adaptive visualization and navigation of multiple distinct data sources and/or disparate data sets.

The examples described herein begin by analyzing one or more selected data sources in their entirety. The analysis includes determining data relationships, using a single-branch approach, which involves determining a starting data table and an ending data table for a series of parent-child relationships between a plurality of data tables arranged in a single row. In the single-branch approach, the starting data table does not have a parent table, the ending data table does not have a child table, and data tables between the starting data table and the ending data table may each have multiple parent data tables but only one child data table.

The examples described herein also create indexes, based on each series of parent-child relationships, where each series of parent-child relationships is associated with an index. The data from the one or more data sets is imported into the indexes and stored in a back-end storage system.

Once the data is analyzed and stored in the indexes, a user can submit a request for a data visualization through verbal commands and/or text entered via a keyboard. In response to receiving the request, the system automatically generates the requested data visualization, which involves determining a format for the data visualization and fetching the data values from the indexes that are relevant to the data visualization. The generated data visualization is displayed to the user. In some examples, the user may request a modification of the data visualization such as changing the timeframe shown in the data visualization or adding/removing data associated with a particular parameter, and the system will automatically generate the modified data visualization for the user.

In this manner, the entirety of the data sets are automatically analyzed, relationships between the data are determined, and the data is stored, according to the determined relationships, such that a user can easily request and obtain data visualizations that may differ significantly from those that may have been envisioned when the data was originally loaded into the system. In conventional systems, someone with extensive experience working with databases would need to pre-build a newly requested data visualization by linking various fields from different data sources.

Figure 1:
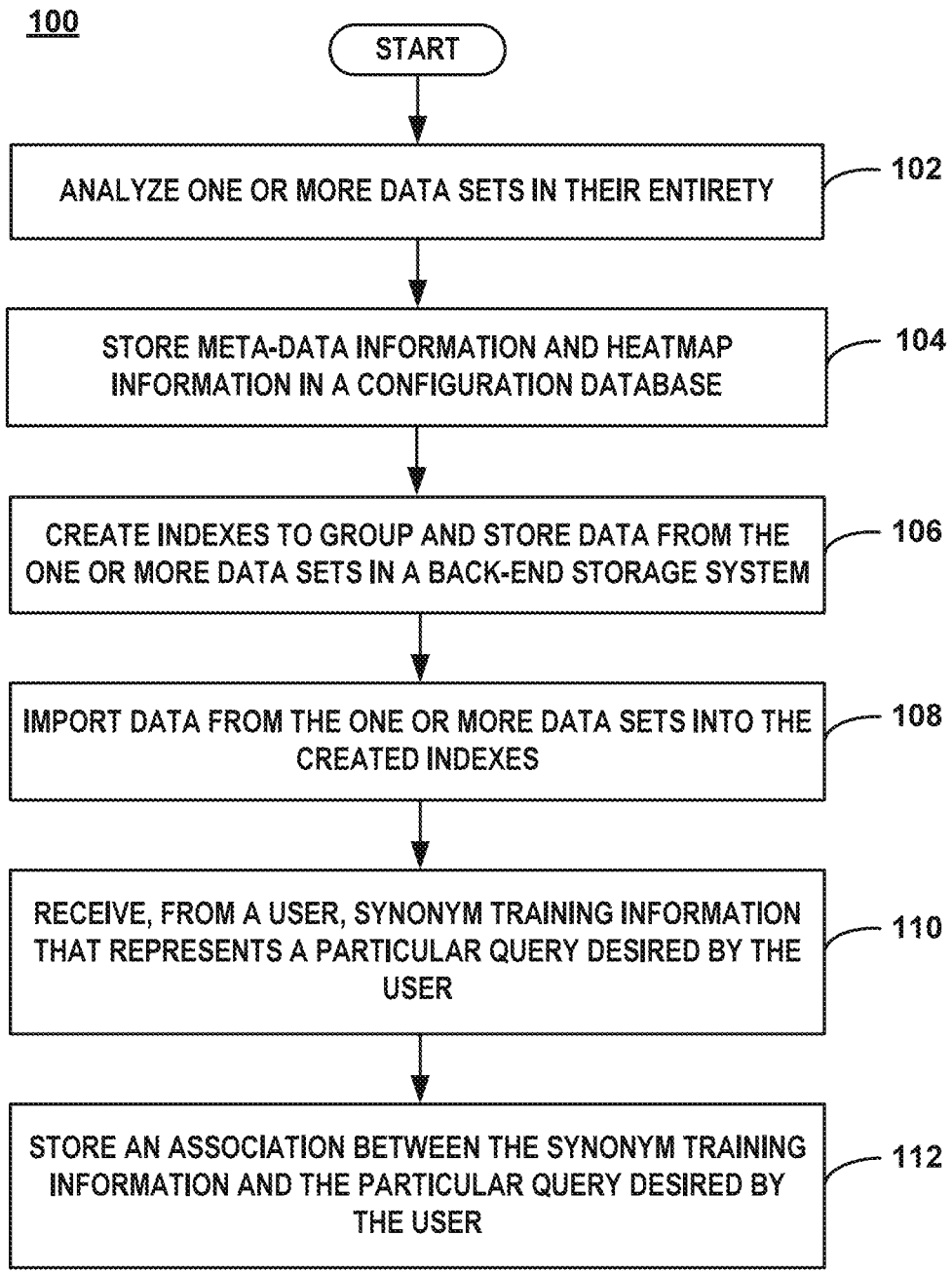
FIG. 1 is a flowchart of an example of a method for system setup in which one or more data sets are analyzed in their entirety, including determining data relationships using a single-branch approach, importing data from the one or more data sets into a plurality of indexes, and storing synonym training information that can be used in the interpretation of a particular query desired by a user.

FIG. 1 is a flowchart of an example of a method for system setup in which one or more data sets are analyzed in their entirety, including determining data relationships using a single-branch approach, importing data from the one or more data sets into a plurality of indexes, and storing synonym training information that can be used in the interpretation of a particular query desired by a user. In some examples, the analysis is performed within an Extract, Transform, and Load (ETL) module within controller 302 of system 300. As described more fully below, the ETL module analyzes all of the data sets or data tables to determine how the data is related, denormalizes the data, and groups them into one or more indexes for search purposes.

The method 100 begins with analyzing 102 one or more data sets in their entirety. The analyzing 102 includes retrieving schema and meta-data information of the one or more data sets. "Schema" refers to the organization of data as a blueprint of how the database is constructed, and "meta-data information" refers to data that provides information about the data values contained in the one or more data sets.

The analyzing 102 also includes generating heatmap information based on the retrieved schema and meta-data information. The heatmap information indicates a relative importance level of data tables and fields within the one or more data sets. For example, in creating the heatmap information, controller 302 determines the most important data tables and fields and assigns a percentage rank (e.g., high-to-low depending on the level of importance) to the data tables and fields, based on the meta-data information.

The analyzing 102 further includes determining data relationships, using a single-branch approach, based on the retrieved schema and meta-data information and data values within the one or more data sets. The single-branch approach refers to the process of determining a starting data table and an ending data table for a series of parent-child relationships between a plurality of data tables arranged in a single row. The single-branch approach follows certain rules for organizing the data tables. In some examples, the single-branch approach rules dictate that the starting data table does not have a parent table, the ending data table does not have a child table, and data tables between the starting data table and the ending data table may each have multiple parent data tables but only one child data table. Organizing data tables according to the single-branch approach advantageously enables the system 300 to automatically generate a data visualization in real-time in response to a user request, as opposed to requiring visualizations to be pre-built and stored as in conventional systems.

Figure 3:
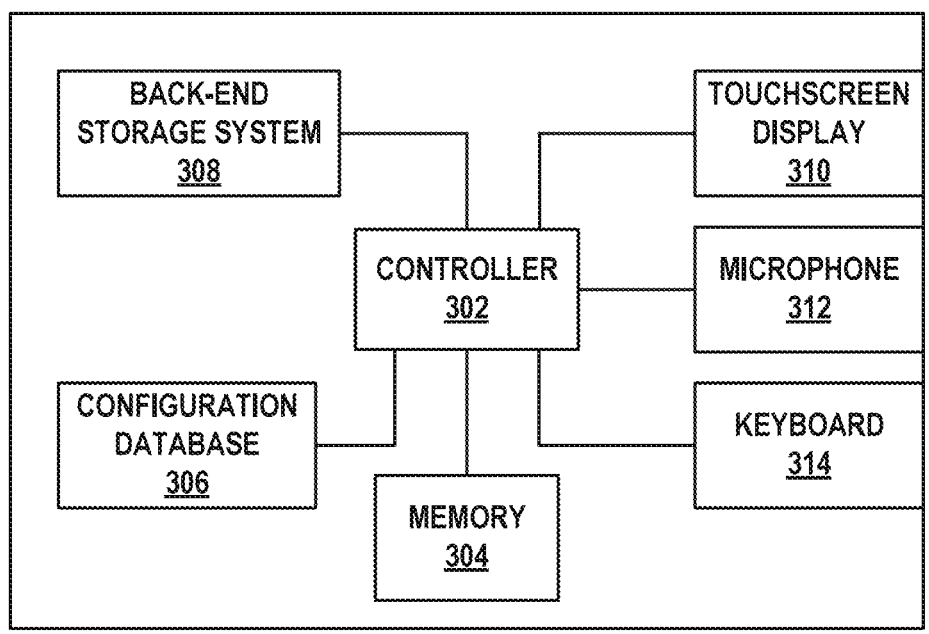
FIG. 3 is a block diagram of an example system that can perform the methods described in connection with FIGS. 1 and 2 and includes a controller, a configuration database, a back-end storage system, and user input devices.

The method 100 continues with storing 104 the meta-data information and the heatmap information in a configuration database 306 (shown in FIG. 3).

The method 100 also includes creating 106 indexes to group and store data from the one or more data sets in a back-end storage system 308 (shown in FIG. 3). As used herein, an index refers to a data structure that stores the data values. The indexes are created based on each series of parent-child relationships, where each series of parent-child relationships is associated with an index. Stated differently, each index is configured to contain a single series of parent-child relationships that were determined according to the single-branch approach.

The method 100 continues with importing 108 data from the one or more data sets into the created indexes, using the stored meta-data information and a data slicing algorithm. It is possible for the imported data to be "inflated," potentially causing duplication of the transferred data. The system 300 has internal algorithms to calculate an "inflation ratio" to allow the assignment of level flags to denote these potential duplicate sets of data. The level flag is used during search and retrieval for data accuracy. In addition, the "Data Slicing" algorithm ensures that the amount of data transferred at any one time is not too large as to cause slowdowns or time-outs and, in effect, ensure maximum speed. The level flag provides a mechanism to solve data redundancy issues common with denormalizing data using anti-duplication logic and split and merge methods.

In the example shown in FIG. 1, method 100 additionally includes receiving 110, from a user, synonym training information that represents a particular query desired by the user. As used herein, a synonym refers to a particular input that is associated with a particular query. In this regard, the input may be a verbal input, a text request, or any other suitable input that system 300 may accept as an input that can be associated with a particular query.

Thus, synonym training information refers to the user submitting an input to system 300 to train system 300 to associate the submitted input with a particular query. Upon receipt of the synonym training information, system 300 stores 112 an association between the received synonym training information and the particular query desired by the user. In some examples, the association between the received synonym training information and the particular query desired by the user is stored in the configuration database 306.

In some examples, the synonym training occurs during a system setup process, in which users are taken through an "interview" process to setup the synonyms that will be used for natural language interpretation, which is discussed more fully below. The synonym training may also occur after system setup, if a user wishes to add or change synonyms.

In other examples, one or more of the steps of method 100 may be omitted, combined, performed in parallel, or performed in a different order than that described herein or shown in FIG. 1. In still further examples, additional steps may be added to method 100 that are not explicitly described in connection with the example shown in FIG. 1. Similarly, any of the features of any of the methods described herein may be performed in parallel or performed in a different manner/order than that described or shown herein.

Figure 2:
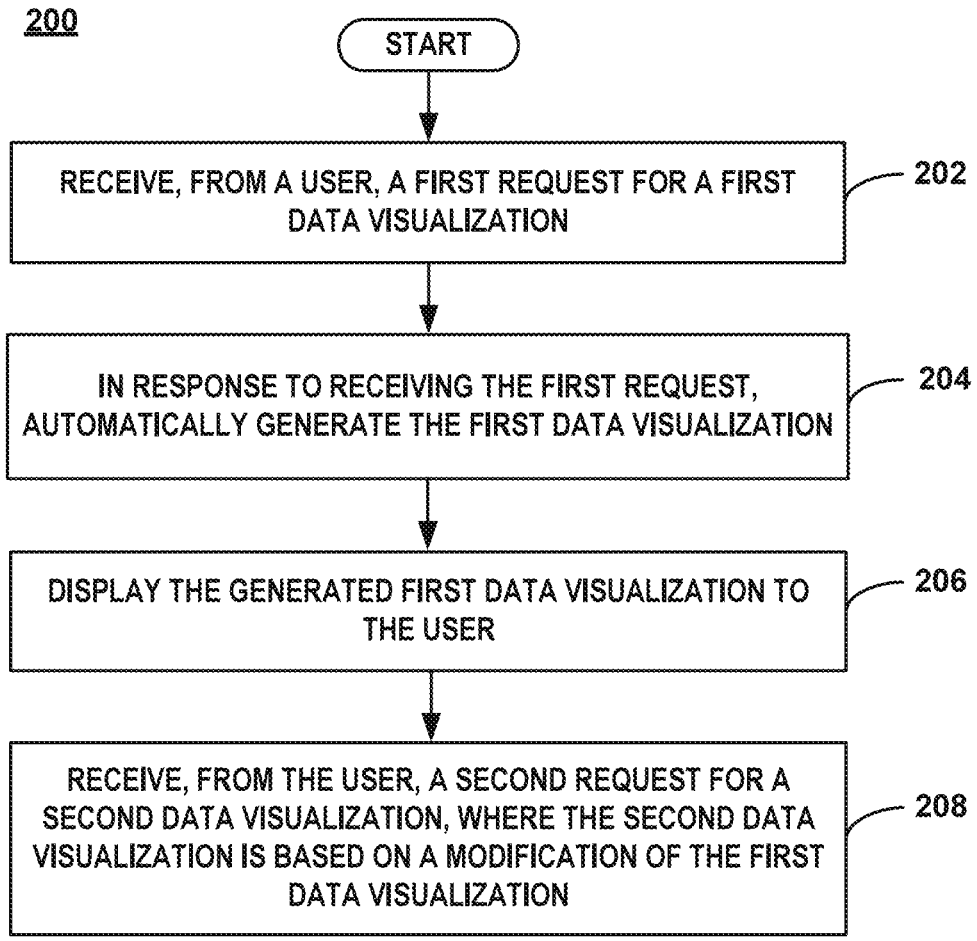
FIG. 2 is a flowchart of an example of a method for automatically generating a first data visualization, which includes determining a format for the first data visualization based at least partially on meta-data information, heatmap information, and the indexes that were generated during the system setup. The user may also request a second data visualization that is based on a modification of the first data visualization.

FIG. 2 is a flowchart of an example of a method for automatically generating a first data visualization, which includes determining a format for the first data visualization based at least partially on meta-data information, heatmap information, and the indexes that were generated during the system setup. The user may also request a second data visualization that is based on a modification of the first data visualization.

The method 200 begins with receiving 202, from a user, a request for a data visualization. In some examples, the request comprises an input that corresponds with the synonym training information that was received during the system setup/interview process. The input may, in some examples, be a verbal request, a text request, and/or entered via a touchscreen. If the system 300 recognizes the input, based on the stored association between the synonym training information received during the system setup and the particular query desired by the user, system 300 will generate the requested data visualization, as described more fully below.

However, if the input does not correspond to a known query parameter, system 300 determines that additional information is required to generate the requested data visualization and requests the additional information from the user. In some examples, the request for additional information takes the form of system 300 performing an ambiguity resolution process with the user, wherein the system 300 asks the user for clarification regarding one or more terms within the user-submitted input that are unclear, unknown, or ambiguous to system 300. Typically, system 300 would ask these questions via a visual display.

The user can provide the requested additional information in any suitable manner (e.g., verbal response, text entry, or input received via touchscreen). System 300 receives the additional information and utilizes the received additional information to resolve the ambiguity and associate the user's initial input with a known query parameter.

Whether the user's original request for a data visualization was correctly understood and interpreted by the system 300 or additional information was required to understand the request, system 300 automatically generates 204 the requested data visualization once the request is understood. As mentioned above, this process is different than conventional systems that do not generate data visualizations in real-time, in response to a simple user request. To the contrary, conventional systems require that data visualizations be pre-built and stored prior to the request for a data visualization.

In some examples, generating the data visualization includes (1) determining a format for the data visualization based at least partially on the meta-data information, the heatmap information, the indexes, and data values that are relevant to the data visualization, and (2) fetching the data values from the indexes that are relevant to the data visualization. System 300 displays 206 the generated data visualization to the user on display 310.

In further examples, upon viewing the displayed data visualization, the user may desire to modify the data visualization. In these cases, the user submits another request for a data visualization that is a modification of the displayed data visualization. This second request may be input to the system in any suitable manner (e.g., verbal request, text request, entered via touchscreen, etc.). For example, if the system 300 presented a first data visualization as a bar graph, the user may want to see the data visualization as a pie chart. In this case, the user could enter a verbal request to the system 300 by saying "Show me this data as a pie chart" into microphone 312, and the system 300 would automatically generate a new data visualization as a pie chart. Alternatively, the user could type "Show me this data as a pie chart" into keyboard 314, and the system 300 would automatically generate a new data visualization as a pie chart. In still further examples, the user could draw a circle on touchscreen display 310, and the system 300 would automatically generate a new data visualization as a pie chart. Conversely, if the system 300 presented the first data visualization as a pie chart and the user wants to see the data visualization as a bar graph, the user could draw a line on touchscreen display 310, and the system 300 would automatically generate a new data visualization as a bar graph. Thus, any suitable input may be customized and recorded by the system 300 as a synonym to facilitate the user's ability to request various types/styles/formats of data visualizations. Examples of various types of data visualizations include, but are not limited to, showing data as a bell curve, polynomial, exponential, time series, and/or straight line.

System 300 receives this second request for a second data visualization, which is based on a modification of the first data visualization, and begins the process of automatically generating the second data visualization in response to the received request. System 300 then displays the second data visualization to the user via display 310. Although this example only shows a second request for a data visualization, which is based on a modification of the first data visualization, it should be understood that there are no limits to how many additional requests that a user can submit in order to continue modifying the data visualizations.

In other examples, one or more of the steps of method 200 may be omitted, combined, performed in parallel, or performed in a different order than that described herein or shown in FIG. 2. In still further examples, additional steps may be added to method 200 that are not explicitly described in connection with the example shown in FIG. 2. Similarly, any of the features of any of the methods described herein may be performed in parallel or performed in a different manner/order than that described or shown herein.

One of the advantages of system 300 is that it allows users to submit a request for a data visualization in unstructured, plain English. No specific structure or pattern is required when making the request. As mentioned above, an interview process may be performed during system setup in which system 300 asks questions of a user (1) regarding the data that is stored in the system 300, and/or (2) to setup synonyms that will be used for natural language interpretation. Based on the answers provided by the user during the interview process, system 300 utilizes the received synonym training information and other information, in a series of algorithms based on rules and patterns, to interpret user requests for data visualizations and generate the data visualizations desired by the user. The process of interpreting requests for data visualizations are handled through a Natural Language Processing (NLP) module within controller 302.

In some examples, the process of interpreting a request for a data visualization involves the following steps. Initially, the received request for a data visualization (also referred to herein as a "sentence") is processed by breaking each "word" of the sentence into tokens. Parts of speech and Name Entity Recognition (NER) information is also determined at this time.

System 300 then utilizes a series of processing algorithms and configuration information (e.g., synonyms, keywords, stop words, definitions, and formulas) to analyze and group words within the sentence to provide a meaningful interpretation. Words determined to be date/time related are handled through a "Date Processing Module" within controller 302 using internal algorithms to interpret both absolute and relative date and time. Words within the sentence that are not able to be determined are marked as "unknown" and are first looked up within the existing data to determine a potential match. Any "unknown" words that cannot be matched, along with words that are determined to be "ambiguous," will be presented to the user during an ambiguity resolution process in which additional information is requested from the user, as mentioned above.

To begin the process, the user enters the following text request via keyboard 314: "Make a comparison of sugar, salt, and pepper sales yoy." The NLP module within controller 302 will detect the specific parts of this sentence and be able to determine that sugar, salt, and pepper are data values. The NLP module will also determine that YOY (e.g., year-over-year) is a date reference for multiple years, which requires a side-by-side comparison for each year. Thus, the NLP module determines the context and intent of the request without limiting the user to ask only in a structured manner. The NLP module further detects where the relevant data values are located in the back-end storage system 308.

In case of ambiguity or the inability of system 300 to understand a specific word in a sentence, system 300 utilizes a FEAR (Failure, Error, Ambiguity Resolution) process to request additional information from the user to help the system 300 resolve the ambiguity or to understand the word that is ambiguous or unknown. Based at least partially on the additional information submitted by the user, the system 300 builds a SQL statement with a structure similar to the following:

```
SELECT FIELDNAME1, FIELDNAME2,..... YEAR(FIELDNAME3), .......
FROM [Index Name]
WHERE (FIELDNAME1 = VALUE OR FIELDNAME2 = VALUE
GROUP BY YEAR(FIELDNAME3)....
ORDER BY YEAR(FIELDNAME3)....
```

After sentence interpretation is completed, a Structured Query Language (SQL) query is formulated and meta-data information containing additional detail information and Following is a partial sample of a meta-data structure for meta-data information that is also provided by the NLP module:

```
1.   NlpDataCheckResult: null
2.   NlpTokensList: [....]
       1.   0: {ParseWords: "COMPARISON", StartIndex: 0, TokenType:
            "KEYWORD", TokenDate: "02/24/2021 08:54:48.66"}
       2.   1: {ParseWords: "OF", StartIndex: 11, TokenType: "NOISE",
            TokenDate: "02/24/2021 08:54:48.66"}
       3.   2: {ParseWords: "SUGAR", StartIndex: 14, TokenType: "TEXT",
            TokenDate: "02/24/2021 08:54:48.66"}
       4.   3: {ParseWords: ",", StartIndex: 19, TokenType: "NUMERIC",
            TokenDate: "02/24/2021 08:54:48.66"}
       5.   4: {ParseWords: "SALT", StartIndex: 21, TokenType: "TEXT",
            TokenDate: "02/24/2021 08:54:48.66"}
``` hints is generated and passed on to a Data Application Programming Interface (API) module within controller 302. The Data API module fetches the relevant data values that have been stored in the back-end storage system 308 so that the requested data visualization can be displayed to the user. The natural language process outlined above is used for new requests for data visualizations as well as subsequent requests for data visualizations that further "drill down" on a previously displayed data visualization or on a data visualization that has been saved within a history of previously generated data visualizations.

Following is an example of the natural language processing (NLP), utilizing a fictional Food Distribution Company. This example assumes that a user has already gone through the system setup/interview process and that the data from one or more data sets has been analyzed, grouped, and imported into indexes according to the single-branch approach, as described above.

The SQL statement and meta-data information provided by the NLP module are used within the Data API module where additional processing is applied to retrieve information from the back-end storage system 308. One key feature in the Data API module is the ability of its internal algorithms to use the SQL and meta-data information to automatically determine the best visualization(s) (whether it be a chart, grid, geo-map, or other) and provide the necessary information (such as chart axis, data values, and other information) to allow the creation and display of the data visualization within the front-end User Interface of system 300.

After system 300 displays the generated data visualization, the user from the Food Distribution Company would see comparisons of sales of products for multiple years, and additional manipulation of this data can be made through various features available in the system 300. For example, formulas can be setup in the system 300 and depicted as part of the data visualization, such as for gross margins of sales, percentage ranks sales of products, and increasing or declining sales. Another example includes the ability to apply predictive analysis to the data visualizations. For example, using touch capability directly on the user interface (e.g., shown on touchscreen display 310), a best fit line calculation can be selected and applied to determine future sales, and information from disruptive events (e.g., such as a previous stock market crash) can easily be setup and added into the data visualization directly from the user interface. Of course, any other suitable formulas and/or customizations can be setup in the system 300 to increase the utility of system 300 to the user.

Further drill down of data can be done using a "Smart Assist" feature of system 300 by directly asking the system in plain, unstructured English. For example, to further drill down from the previous result, the user from the Food Distribution Company may ask: "Let me see only 2020 and 2021." The right side of FIG. 4 shows the data visualization generated by the system 300 in response to the initial user request in this example, and the left side of FIG. 4 shows the data visualization generated by the system 300 in response to the subsequent (e.g., drill down) user request submitted by the user.

An additional feature of the Data API module consists of "Column Mapping" logic. The Column Mapping logic provides the ability to handle columnar data consisting of numeric information that reflects specific periods of time based on their column labels and is specific to certain types of industries. One example that would use this type of logic would relate to forecasting information provided quarterly. Through this logic, the system 300 is able to handle the search and retrieval of both columnar and transaction data and display both together in data visualizations. An example of such a data visualization is shown in FIG. 5.

The examples described herein differ from conventional analytics applications by providing a system with limited involvement from the user for setup and configuration purposes, which is due to the system 300 analyzing the data sets in their entirety and storing them according to the single-branch approach. The users do not need to have a technical background to use the system 300, and Information Technology or software development staff do not need to be involved if the user of the system asks for information in different ways or manipulates the data visualizations for a different view of the data.

System 300 advantageously employs an easy-to-use approach of allowing natural language sentences when requesting data visualizations, automatically determines the data visualizations instead of pre-building the visualizations, and allows further drill down using natural language and various touch/hand gestures. Thus, the system 300 is a problem-solving tool allowing business executives the ability to dig deeper to find and review potential trends and make quick and easy adjustments to the data visualizations to depict useful information.

FIG. 3 is a block diagram of an example system 300 that can perform the methods described in connection with FIGS. 1 and 2. System 300 includes controller 302, memory 304, configuration database 306, back-end storage system 308, touchscreen display 310, microphone 312, and keyboard 314. Controller 302 includes any combination of hardware, software, and/or firmware for executing the functions described herein as well as facilitating the overall functionality of system 300. An example of a suitable controller 302 includes code running on a microprocessor or processor arrangement connected to memory 304. For example, any of the modules described herein may be implemented within controller 302 as code running on a microprocessor or processor arrangement.

Configuration database 306 is a database configured to store configuration information such as meta-data information and heatmap information, as described above. Back-end storage system 308 is a storage system (e.g., non-relational database system) configured to store data in indexes. In some examples, each index stores data associated with a single series of parent-child relationships that were determined using the single-branch approach, as described above.

Touchscreen display 310 is a display that is coupled to controller 302 and is capable of displaying data visualizations generated by system 300 and receiving user inputs via a touchscreen. In other examples, the touchscreen and the display may be separate components.

Microphone 312 is any suitable microphone coupled to controller 302 configured to receive verbal inputs from a user. In other examples, any other suitable transducer capable of converting sound waves into input signals may be used.

Keyboard 314 is any keyboard (e.g., physical, soft, or virtual) coupled to controller 302 and configured to receive keystrokes from a user as inputs. In other examples, any other suitable device/sensor, such as a head-pointing device or an eye-tracking input device, may be used to receive user inputs.

Although the example shown in FIG. 3 depicts a computer system in which all of the system components are located within a single system or at a single location, any one or more of the system components may be located in different systems and/or locations. For example, in some examples in which the functionality described herein is provided as a Software as a Service (SaaS), a user may have a thin client installed on their local computer system, which includes controller 302, memory 304, touchscreen display 310, microphone 312, and keyboard 314, but the configuration database 306 and back-end storage system 308 may be located (e.g., hosted) on servers in a different location.

In other examples, one or more of the components of system 300 may be omitted, combined, moved, or modified to operate in a manner other than that described herein or shown in FIG. 3. In still further examples, additional components/features described herein may be added to system 300 that are not explicitly described in connection with the example shown in FIG. 3.

FIG. 6 shows an example of a sample data set for which data relationships will be determined using a single-branch approach. The sample data set shown includes data tables (e.g., CLIENT), each data table having fields associated with that data table (e.g., CLIENT_ID, NAME, ADDRESS). FIG. 7 shows a graphical representation of the data relationship connections for the sample data set from FIG. 6. As discussed above, the systems and methods described herein determine a starting data table and an ending data table for a series of parent-child relationships between a plurality of data tables arranged in a single row, wherein the starting data table does not have a parent table, the ending data table does not have a child table, and data tables between the starting data table and the ending data table may each have multiple parent data tables but only one child data table. In some examples, the ending data table is determined first and then, based on the parent-child relationship rules set forth above, a starting data table is determined for that single-branch. As shown in the examples of FIGS. 8A and 8B, there may be a plurality of single-branches determined from the data set, each single-branch having only one starting data table and only one ending data table, respectively.

For example, FIG. 8A shows a graphical representation of the determined data relationships for three single branches for the sample data set from FIG. 6. More specifically, Single Branch #1 of FIG. 8A shows a single-branch that begins with the COUNTY starting data table and ends with the INVENTORY ending data table. This single-branch reflects the data connections on the leftmost portion of FIG. 7. Single Branch #2 of FIG. 8A shows a single-branch that begins with the PRODUCT_CATEGORY starting data table and ends with the INVENTORY ending data table. This single-branch reflects the data connections that span between the INVENTORY data table on the leftmost portion of FIG. 7 and move inward and down through the PRODUCT data table to the PRODUCT_CATEGORY data table. Single Branch #3 of FIG. 8A shows a single-branch that begins with the PRODUCT_CATEGORY starting data table and ends with the ITEM_ORDER ending data table. This single-branch reflects the data connections that span between the ITEM_ORDER data table at the top of FIG. 7 and downward and to the left through the PRODUCT data table to the PRODUCT_CATEGORY data table.

FIG. 8B shows a graphical representation of the determined data relationships for an additional three single branches. More specifically, Single Branch #4 of FIG. 8B shows a single-branch that begins with the EMPLOYEE starting data table and ends with the ITEM_ORDER ending data table. This single-branch reflects the data connections that span between the ITEM_ORDER data table at the top of FIG. 7 and move downward through the ORDER data table to the EMPLOYEE data table. Single Branch #5 of FIG. 8B shows a single-branch that begins with the CLIENT starting data table and ends with the ITEM_ORDER ending data table. This single-branch reflects the data connections that span between the ITEM_ORDER data table at the top of FIG. 7 and move downward through the ORDER data table and then downward and to the right to the CLIENT data table. Single Branch #6 of FIG. 8B shows a single-branch that begins with the CLIENT starting data table and ends with the CLIENT_CONTACT ending data table. This single-branch reflects the data connections that span between the CLIENT_CONTACT data table at the top of FIG. 7 and move downward to the CLIENT data table.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A method comprising:
    performing the following with at least one controller, which includes code running on a processor connected to memory:
        analyzing one or more data sets in their entirety, the analyzing comprising:
            retrieving schema and meta-data information of the one or more data sets, and
            generating heatmap information based on the retrieved schema and meta-data information, the heatmap information indicating a relative importance level of data tables and data fields within the one or more data sets;
        storing the meta-data information and the heatmap information in a configuration database;
        creating indexes to group and store data from the one or more data sets in a back-end storage system;
        importing data from the one or more data sets into the created indexes, using the stored meta-data information;
        receiving, from a user, a first request for a first data visualization;
        in response to receiving the first request, automatically generating the first data visualization in real-time without the first data visualization being pre-built and stored prior to receiving the first request, wherein automatically generating the first data visualization comprises:
            determining a format for the first data visualization based at least partially on the meta-data information, the heatmap information, the indexes, and data values that are relevant to the first data visualization, and
            fetching the data values from the indexes that are relevant to the first data visualization; and
        displaying the generated first data visualization to the user.

2. The method of claim 1, further comprising determining data relationships based on the retrieved schema and meta-data information and data values within the one or more data sets, the data relationships determined using a single-branch approach, wherein the single-branch approach comprises determining a starting data table and an ending data table for a series of parent-child relationships between a plurality of data tables arranged in a single row, wherein the starting data table does not have a parent table, the ending data table does not have a child table, and data tables between the starting data table and the ending data table may each have multiple parent data tables but only one child data table.

3. The method of claim 2, wherein creating indexes is based on each series of parent-child relationships, where each series of parent-child relationships is associated with an index, each index being a data structure configured to contain a single series of parent-child relationships that were determined according to the single-branch approach, wherein data from each of the plurality of data tables of the single series of parent-child relationships is stored within the index.

4. The method of claim 1, further comprising:
    receiving, from the user, synonym training information that represents a particular query desired by the user; and
    storing an association between the synonym training information and the particular query desired by the user.

5. The method of claim 4, wherein receiving, from the user, the first request for the first data visualization comprises receiving a first input that corresponds with the synonym training information, and
    wherein the first data visualization is generated utilizing the stored association between the synonym training information and the particular query desired by the user.

6. The method of claim 5, wherein the first input is a verbal request.

7. The method of claim 5, wherein the first input is entered as a text request.

8. The method of claim 5, wherein the first input is entered via a touchscreen.

9. The method of claim 5, further comprising:
receiving, from the user, a second input that does not correspond to a known query parameter;
in response to receiving the second input, determining that additional information is required to generate the first data visualization;
requesting the additional information from the user;
receiving the additional information from the user;
utilizing the received additional information to associate the second input with a known query parameter; and
generating the first data visualization utilizing the association between the second input and the known query parameter.

10. The method of claim 1, further comprising:
receiving, from the user, a second request for a second data visualization, wherein the second data visualization is based on a modification of the first data visualization.

11. A system comprising:
at least one controller, which includes code running on a processor connected to memory, the controller configured to:
analyze one or more data sets in their entirety, wherein the at least one controller is further configured to:
retrieve schema and meta-data information of the one or more data sets, and
generate heatmap information based on the retrieved schema and meta-data information, the heatmap information indicating a relative importance level of data tables and data fields within the one or more data sets,
store the meta-data information and the heatmap information in a configuration database,
create indexes to group and store data from the one or more data sets in a back-end storage system,
import data from the one or more data sets into the created indexes, using the stored meta-data information,
receive, from a user, a first request for a first data visualization, and
in response to receiving the first request, automatically generate the first data visualization in real-time without the first data visualization being pre-built and stored prior to receiving the first request, wherein the at least one controller is further configured to:
determine a format for the first data visualization based at least partially on the meta-data information, the heatmap information, the indexes, and data values that are relevant to the first data visualization, and
fetch the data values from the indexes that are relevant to the first data visualization; and
a display communicatively coupled to the at least one controller, the display configured to display the generated first data visualization to the user.

12. The system of claim 11, wherein the controller is further configured to determine data relationships based on the retrieved schema and meta-data information and data values within the one or more data sets, the data relationships determined using a single-branch approach, wherein the single-branch approach comprises determining a starting data table and an ending data table for a series of parent-child relationships between a plurality of data tables arranged in a single row, wherein the starting data table does not have a parent table, the ending data table does not have a child table, and data tables between the starting data table and the ending data table may each have multiple parent data tables but only one child data table.

13. The system of claim 12, wherein the controller is further configured to create indexes based on each series of parent-child relationships, where each series of parent-child relationships is associated with an index, each index being a data structure configured to contain a single series of parent-child relationships that were determined according to the single-branch approach, wherein data from each of the plurality of data tables of the single series of parent-child relationships is stored within the index.

14. The system of claim 11, wherein the at least one controller is further configured to:
receive, from the user, synonym training information that represents a particular query desired by the user; and
store an association between the synonym training information and the particular query desired by the user.

15. The system of claim 14, wherein the first request for the first data visualization comprises a first input that corresponds with the synonym training information, and
wherein the at least one controller is further configured to generate the first data visualization utilizing the stored association between the synonym training information and the particular query desired by the user.

16. The system of claim 15, further comprising a microphone, and wherein the first input is a verbal request received via the microphone.

17. The system of claim 15, further comprising a keyboard, and wherein the first input is entered as a text request via the keyboard.

18. The system of claim 15, further comprising a touchscreen display, and wherein the first input is entered via the touchscreen display.

19. The system of claim 15, wherein the at least one controller is further configured to:
receive, from the user, a second input that does not correspond to a known query parameter;
in response to receiving the second input, determine that additional information is required to generate the first data visualization;
request the additional information from the user;
receive the additional information from the user;
utilize the received additional information to associate the second input with a known query parameter; and
generate the first data visualization utilizing the association between the second input and the known query parameter.

20. The system of claim 11, wherein the at least one controller is further configured to:
receive, from the user, a second request for a second data visualization, wherein the second data visualization is based on a modification of the first data visualization.

* * * * *